United States Patent
Park et al.

(10) Patent No.: US 10,933,733 B2
(45) Date of Patent: Mar. 2, 2021

(54) POWER TRANSMISSION APPARATUS FOR HYBRID ELECTRIC VEHICLE

(71) Applicants: HYUNDAI MOTOR COMPANY, Seoul (KR); KIA MOTORS CORPORATION, Seoul (KR)

(72) Inventors: Juhyeon Park, Gyeongsangnam-do (KR); Seong Wook Hwang, Gunpo-si (KR); Jae Young Jeon, Osan-si (KR); Dongwoo Gwak, Hwaseong-si (KR); Seongeun Yun, Bucheon-si (KR); Wonmin Cho, Hwaseong-si (KR); Bong Hyun Cho, Gunpo-si (KR); Seongwook Ji, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/655,444

(22) Filed: Oct. 17, 2019

(65) Prior Publication Data

US 2021/0001705 A1 Jan. 7, 2021

(30) Foreign Application Priority Data

Jul. 4, 2019 (KR) .......................... 10-2019-0080479

(51) Int. Cl.
*B60K 6/365* (2007.10)
*B60K 6/40* (2007.10)
(Continued)

(52) U.S. Cl.
CPC .............. *B60K 6/365* (2013.01); *B60K 6/387* (2013.01); *B60K 6/40* (2013.01); *B60K 6/445* (2013.01); *F16D 21/02* (2013.01); *F16H 3/727* (2013.01); *B60Y 2200/92* (2013.01); *F16H 2200/0021* (2013.01)

(58) Field of Classification Search
None
See application file for complete search history.

(56) References Cited

U.S. PATENT DOCUMENTS 6,966,860 B2 * 11/2005 Heitmann ................ B60K 6/48
 475/10
7,364,523 B2 * 4/2008 Heitmann ................ B60K 6/40
 475/5

(Continued)

*Primary Examiner* — Dirk Wright
(74) *Attorney, Agent, or Firm* — Brinks Gilson & Lione

(57) ABSTRACT

A power transmission apparatus for hybrid electric vehicle includes: input shaft coaxially disposed with an engine output shaft receiving engine torque; first and second output shafts coaxially disposed forward and rearward sides on the input shaft; third output shaft coaxial with the first output shaft; a shared drum connected to the input shaft and formed with a motor gear gear-meshed with a motor; an engine clutch sharing the shared drum and selectively transmitting torque between the engine output shaft and the input shaft; first and third clutches disposed in rows within the shared drum and selectively transmitting torque from the input shaft to the first and third output shafts; a planetary gear set disposed on the second output shaft and connected to the second output shaft; and a second clutch external to the planetary gear set and selectively connecting the input shaft and the planetary gear set.

14 Claims, 3 Drawing Sheets

(51) Int. Cl.
*F16H 3/72* (2006.01)
*B60K 6/445* (2007.10)
*F16D 21/02* (2006.01)
*B60K 6/387* (2007.10)

(56) References Cited

U.S. PATENT DOCUMENTS

| | | | |
|---|---|---|---|
| 8,241,161 B2* | 8/2012 | Schoenek | B60W 20/40 |
| | | | 475/5 |
| 2008/0227592 A1* | 9/2008 | Steffen | F02N 15/02 |
| | | | 477/19 |

* cited by examiner

POWER TRANSMISSION APPARATUS FOR HYBRID ELECTRIC VEHICLE

CROSS-REFERENCE TO RELATED APPLICATION

This application claims priority to and the benefit of Korean Patent Application No. 10-2019-0080479, filed on Jul. 4, 2019, the entire contents of which are incorporated herein by reference.

FIELD

The present disclosure relates to a power transmission apparatus for a hybrid electric vehicle.

BACKGROUND

The statements in this section merely provide background information related to the present disclosure and may not constitute prior art.

Environment-friendly technology in vehicles is a core technology of a future automobile industry, and automakers are focusing on developing environment-friendly vehicles to achieve environmental and fuel efficiency regulations.

In order to improve energy efficiency and driving convenience, various types of vehicles have been developed, such as an electric vehicle (EV) and a hybrid electric vehicle (HEV) that utilize electrical energy, and a vehicle equipped with a double clutch transmission (DCT).

The hybrid electric vehicle is a vehicle using two or more power sources that may be combined in various schemes. In general, a motor/generator driven by electric energy is combined with either a gasoline engine or a diesel engine, which uses fossil fuels as the power sources.

The DCT alternatingly activates odd-numbered shift-stages and even-numbered shift-stages by alternatingly operating two clutches, and thereby improves continuity in torque transmission.

Recently, such a DCT is applied to a hybrid electric vehicle (HEV) so as to enhance an energy efficiency by reducing fuel consumption.

We have discovered that the efficient combination of the double clutch transmission (DCT) and the hybrid electric vehicle (HEV), such as modularizing the double clutch together with the motor of the hybrid electric vehicle, contributes to enhancing energy efficiency.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a hybrid electric vehicle having advantages of reduced number of parts and decreased length and weight by disposing two clutches in two rows in the radial direction at a forward portion of an input shaft receiving a torque of the engine output shaft through an engine clutch, and separately disposing another clutch at a rearward portion of the input shaft.

Number of parts for receiving a torque of a motor may also be reduced by a power transmission apparatus for a hybrid electric vehicle where the two clutches disposed in two rows share a clutch drum with the engine clutch, and the clutch drum is formed with a motor gear externally gear-meshed with the motor to receive a torque from the motor.

When a clutch is separated to the rearward portion of the input shaft, there may be provided a better space at a forward portion of the transmission for a differential gear, which provides an advantage in the layout of the transmission.

In an exemplary form of the present disclosure, a power transmission apparatus for a hybrid electric vehicle having an engine and a motor as power sources may include: an engine output shaft, an input shaft, first and second output shafts, a third output shaft, a shared clutch drum, an engine clutch, first and third clutches, a planetary gear set, and a second clutch. The engine output shaft may receive a torque of the engine. The input shaft may be coaxially disposed with the engine output shaft. The first and second output shafts may be formed as hollow shafts coaxial with the input shaft, and respectively disposed at forward and rearward sides of the input shaft without rotational interference. The third output shaft may be formed as a hollow shaft and coaxially disposed with the first output shaft without rotational interference.

The shared clutch drum may be disposed at the forward side of the input shaft and may have a motor gear formed on an exterior circumference of the shared clutch drum to be externally gear-meshed with the motor. The shared clutch drum may have an interior circumference rotatably supported by a supporting end formed at a radially interior side of a front cover, and is connected to the input shaft through a connection plate. The engine clutch may be arranged on the interior circumference of the shared clutch drum and be configured to selectively transmit a torque between the engine output shaft and the input shaft. The first and third clutches may be disposed in two rows in a radial direction within the interior circumference of the shared clutch drum and configured to selectively transmit the torque of the input shaft to the first and third output shafts, respectively. The planetary gear set may be disposed on the second output shaft and include a ring gear spline-engaged with the second output shaft through a connection ring. The second clutch may be disposed radially external to the planetary gear set and selectively connect the input shaft and a sun gear of the planetary gear set.

The connection plate may be formed in a disk shape disposed between the engine clutch and the third clutch, and comprises: a radially outer portion spline-engaged with the interior circumference of the shared clutch drum, and a radially inner portion spline-engaged with an exterior circumference of the input shaft.

The engine clutch may include a plurality of engine clutch plates, an engine clutch hub, a plurality of engine clutch disks, and an engine clutch piston. The plurality of engine clutch plates may be spline-engaged with the interior circumference of the shared clutch drum. The engine clutch hub may be fixed to an extended end of the engine output shaft. The plurality of engine clutch disks may be alternatingly disposed between the plurality of engine clutch plates and spline-engaged with an exterior circumference of the engine clutch hub. The engine clutch piston may be disposed between an engine slave cylinder and the plurality of engine clutch plates to frictionally operate the plurality of engine clutch plates and the plurality of engine clutch disks by the engine slave cylinder.

The engine slave cylinder may be formed at an interior of the supporting end of the front cover.

The first clutch may include a plurality of first clutch plates, a first clutch hub, a plurality of first clutch disks, and a first clutch piston. The plurality of first clutch plates may be spline-engaged with the interior circumference of the shared clutch drum. The first clutch hub may be spline-engaged with an exterior circumference of the first output shaft through a first connecting member. The plurality of first clutch disks may be alternatingly disposed between the plurality of first clutch plates and spline-engaged with an exterior circumference of the first clutch hub. The first clutch piston may be disposed between a first slave cylinder and the first clutch plates and configured to frictionally operate the first clutch plates and the first clutch disks by the first slave cylinder.

The first connecting member may be supported in an axial direction by the connection plate via a bearing interposing between the first connecting member and the connection plate.

The third clutch may include a third clutch drum, a plurality of third clutch plates, a third clutch hub, a plurality of third clutch disks, and a third clutch piston. The third clutch drum may be disposed radially interior to the first clutch and connected to the interior circumference of the shared clutch drum to be fixed in an axial direction. The plurality of third clutch plates may be spline-engaged with the interior circumference of the third clutch drum. The third clutch hub may be spline-engaged with an exterior circumference of the third output shaft through a third connecting member. The plurality of third clutch disks may be alternatingly disposed between the plurality of third clutch plates and spline-engaged with an exterior circumference of the third clutch hub. The third clutch piston may be disposed between a third slave cylinder and the third clutch plates and configured to frictionally operate the third clutch plates and the third clutch disks by the third slave cylinder.

The third connecting member may be supported in the axial direction by the first connecting member via a bearing interposing between the third connecting member and the first connecting member.

The third clutch may further include a restoring unit disposed between the third clutch piston and the third connecting member connected to the third clutch hub.

The restoring unit may include a supporting member and a plurality of springs. The supporting member may have radially inner and outer portions, where the radially inner portion is rotatably supported by an exterior circumference of the third connecting member via a bearing (B) and the radially outer portion is spline-engaged with the interior circumference of the third clutch drum. The plurality of springs may be disposed between the supporting member and the third clutch piston.

The first and third slave cylinders may be installed in a transmission case in two rows in the radial direction.

The second clutch may include a second clutch drum, a plurality of second clutch plates, a second clutch hub, a plurality of second clutch disks, and a second slave cylinder. The second clutch drum may be disposed radially external to the planetary gear set and spline-engaged with the input shaft through a second connecting member. The plurality of second clutch plates may be spline-engaged with the interior circumference of the second clutch drum. The second clutch hub may be fixedly connected to the sun gear of the planetary gear set. The plurality of second clutch disks may be alternatingly disposed between the plurality of second clutch plates and spline-engaged with an exterior circumference of the second clutch hub. The second slave cylinder may be disposed in the transmission case and configured to frictionally operate the second clutch plates and the second clutch disks.

The second connecting member may be rotatably supported in an axial direction by the connection ring and the transmission case via bearings.

The second slave cylinder may include a second clutch piston, a supporting bearing, and a return spring. The second clutch piston corresponds to the second clutch plates in an axial direction and may be disposed in a hydraulic chamber formed in the transmission case. The supporting bearing may be disposed between the second clutch plates and the second clutch piston. The return spring may be disposed between a radially outer portion of the second clutch piston and a spring retainer fixed to the transmission case.

According to an exemplary form, a first clutch sharing a shared clutch drum with the engine clutch is disposed adjacent to the engine clutch at a forward portion of the input shaft, the third clutch is disposed in a radially interior side of the first clutch to form two rows in the radial direction, and the second clutch is separately arranged at a rearward portion of the input shaft, thereby reducing number of parts in the transmission and decreasing length and weight.

In addition, the number of parts for receiving a torque of the motor may be reduced since the first and third clutches disposed in two rows in the radial direction share a shared clutch drum with the engine clutch, and the shared clutch drum is formed with a motor gear externally gear-meshed with the motor to receive a torque from the motor.

In addition, since the second clutch is separated to the rearward portion of the input shaft, there may be provided a better space at a forward portion of the transmission for a differential gear, which provides an advantage in the layout of the transmission.

In addition, in an exemplary form, the second clutch piston of the second clutch is integrally formed with the second slave cylinder and installed in a hydraulic chamber formed in the transmission case, thereby reducing a space for arranging the second clutch piston.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
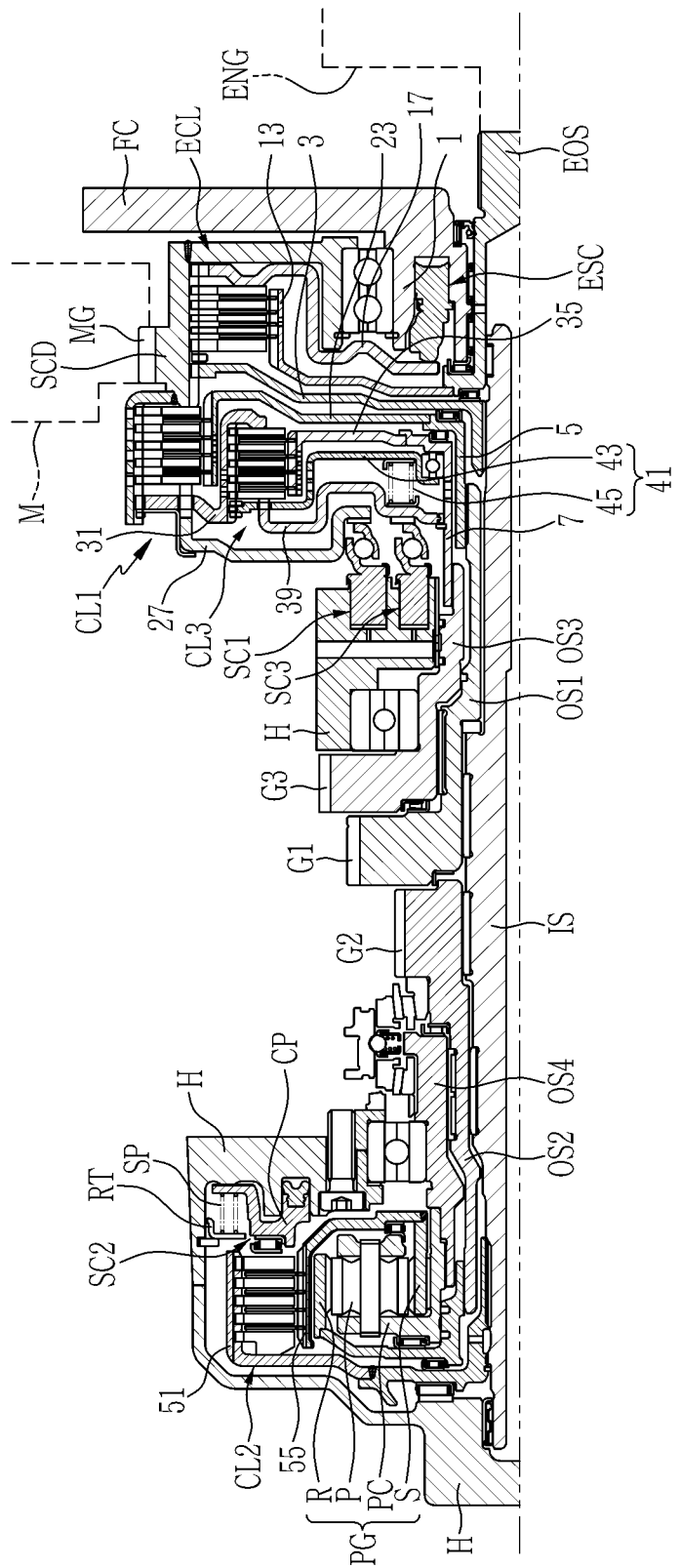
FIG. 1 is a cross-sectional view of a power transmission apparatus for a hybrid electric vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An exemplary form of the present disclosure will hereinafter be described in detail with reference to the accompanying drawings.

In the following description, dividing names of components into first, second and the like is to divide the names because the names of the components are the same as each other and an order thereof is not particularly limited.

Figure 2:
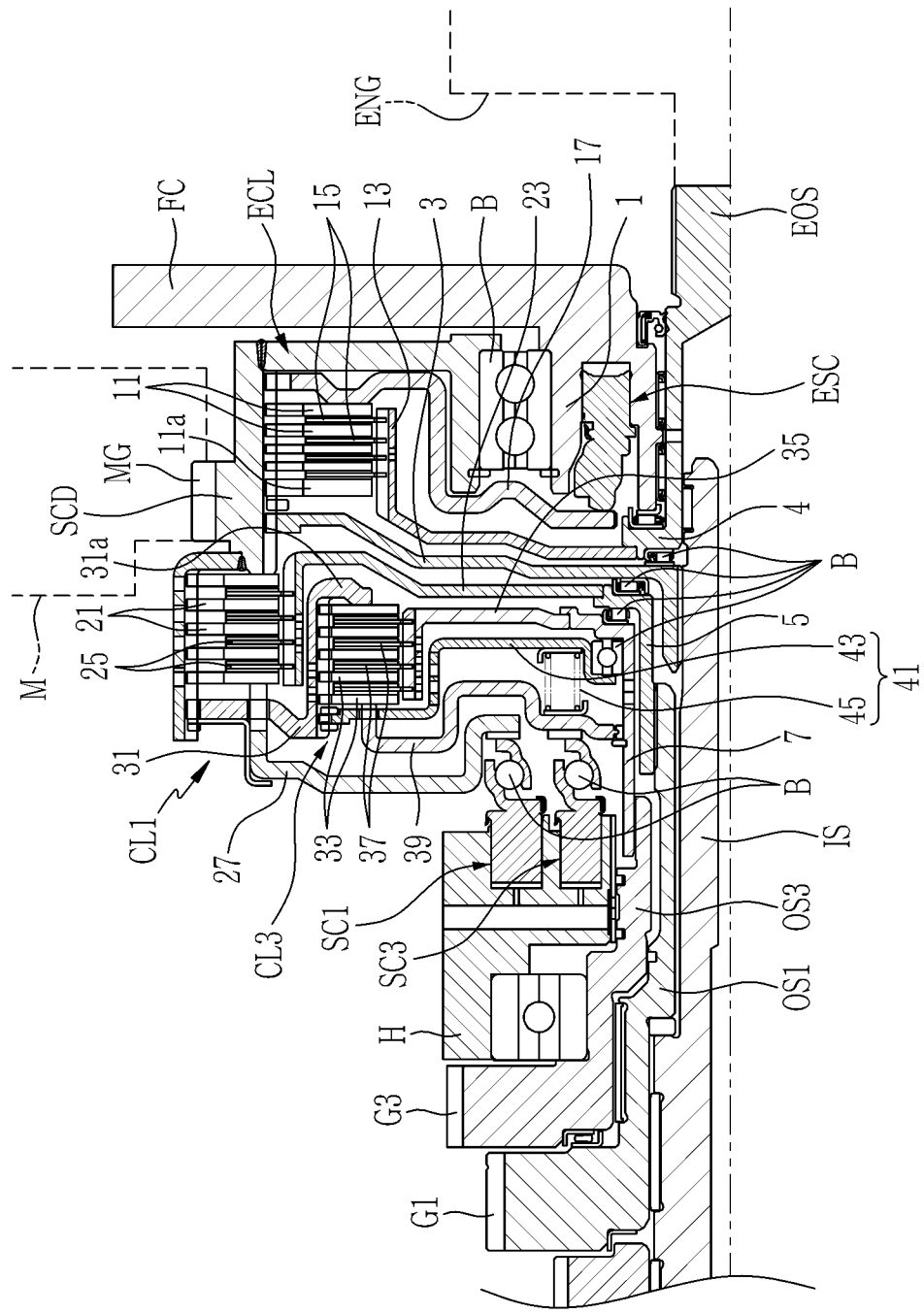
FIG. 2 is an enlarged cross-sectional view of a forward portion of a power transmission apparatus for a hybrid electric vehicle according to an exemplary form of the present disclosure.
Figure 3:
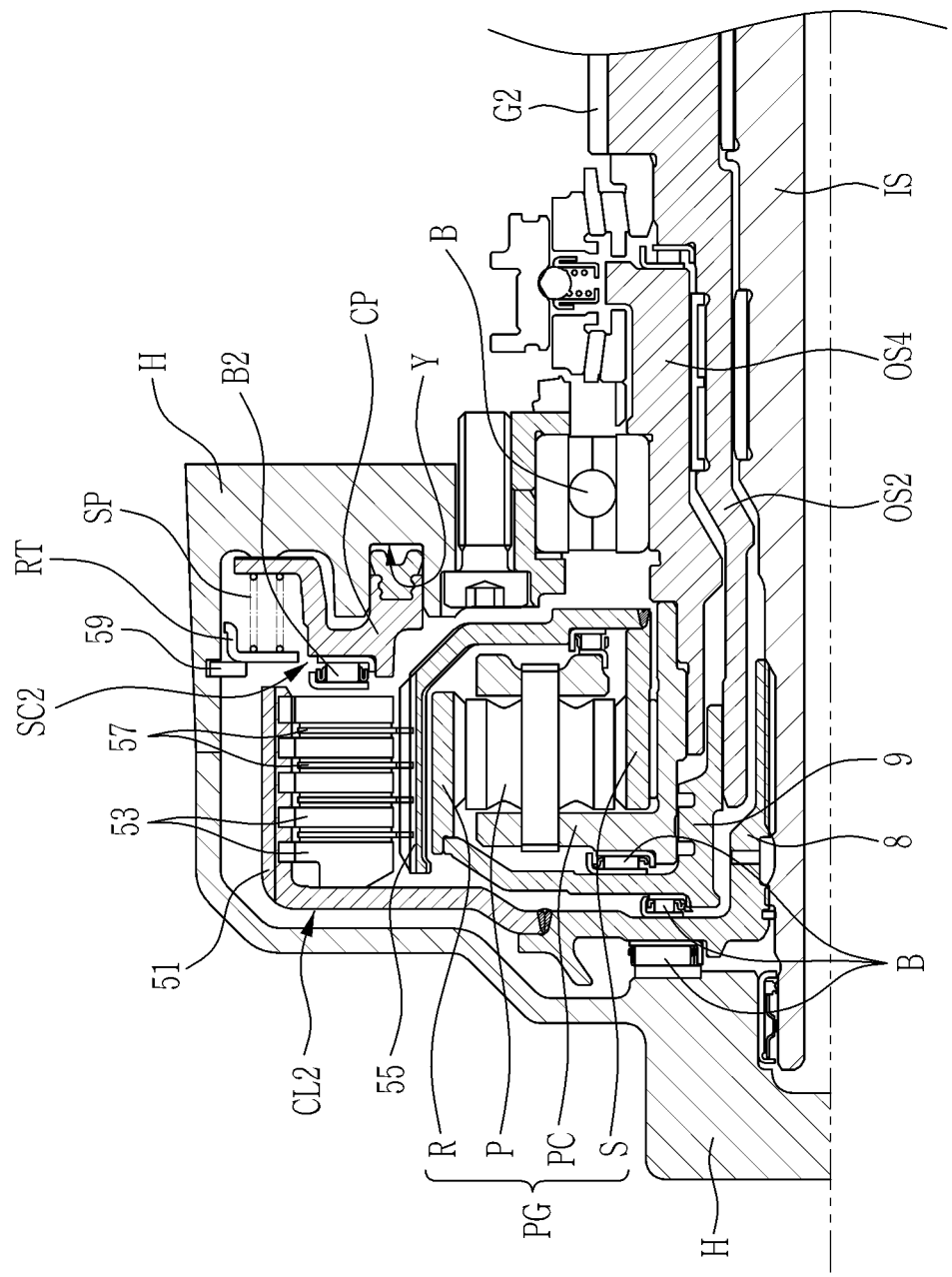
FIG. 3 is an enlarged cross-sectional view of a rearward portion of a power transmission apparatus for a hybrid electric vehicle according to an exemplary form of the present disclosure.

FIG. 1 is a cross-sectional view of a power transmission apparatus for a hybrid electric vehicle according to an exemplary form of the present disclosure. FIG. 2 is an enlarged cross-sectional view of a forward portion of a power transmission apparatus for a hybrid electric vehicle according to an exemplary form of the present disclosure. FIG. 3 is an enlarged cross-sectional view of a rearward portion of a power transmission apparatus for a hybrid electric vehicle according to an exemplary form of the present disclosure.

Referring to FIG. 1 and FIG. 2, the power transmission apparatus for a hybrid electric vehicle (hereinafter called a power transmission apparatus) receives torques from an engine ENG and a motor M, and selectively transmits the received torques to an input shaft IS and three output shafts OS1, OS2, and OS3 through four clutches ECL, CL1, CL2, and CL3.

Here, the motor M may include a rotor and a stator and may act as a motor and a generator that generates electricity, as in an electric vehicle.

A power transmission apparatus according to an exemplary form includes an engine output shaft EOS, the input shaft IS, the first, second, and third output shafts OS1, OS2, and OS3, a shared clutch drum SCD, an engine clutch ECL, first, second, and third clutches CL1, CL2, and CL3, and a planetary gear set PG.

The engine output shaft EOS, e.g., a damper output shaft, is a torque mediating shaft receiving the torque of the engine ENG, and is disposed penetrating supporting end 1 formed at a radially interior side of a front cover FC of a transmission case H.

The input shaft IS is coaxially disposed with engine output shaft EOS in the transmission case H, and is configured to receive a torque of the engine output shaft EOS by the operation of the engine clutch ECL.

The first output shaft OS1 is formed as a hollow shaft coaxial with the input shaft and disposed at a forward side of the input shaft IS without rotational interference, and the second output shaft OS2 is formed as a hollow shaft coaxial with the input shaft and disposed at a rearward side of the input shaft IS without rotational interference.

In addition, the third output shaft OS3 is formed as a hollow shaft, and is coaxially disposed with the first output shaft OS1 without rotational interference.

The first, second, and third output shafts OS1, OS2, and OS3 are configured to receive the torque of the engine output shaft EOS by the operation of the first, second, and third clutches CL1, CL2, and CL3, while the engine clutch ECL is operated.

That is, the first, second, and third output shafts OS1, OS2, and OS3 may selectively receive the torque through the first, second, and third clutches CL1, CL2, and CL3, respectively, and the output shaft OS1, OS2, and OS3 are formed with first, second, and third output gears G1, G2, and G3, respectively.

The shared clutch drum SCD is disposed at a forward side of the input shaft IS. A motor gear MG is formed on an exterior circumference of the shared clutch drum SCD such that the motor M is externally gear-meshed with the motor gear MG. An interior circumference of the shared clutch drum SCD is formed in parallel with and rotatably supported, through a bearing B, by the supporting end 1 formed at a radially interior side of the front cover FC.

In addition, the shared clutch drum SCD is connected to the input shaft IS through a connection plate 3.

Here, the connection plate 3 is formed in a disk shape and disposed between the engine clutch ECL and the third clutch CL3. A radially outer portion of the connection plate 3 is spline-engaged with an interior circumference of the shared clutch drum SCD, and a radially inner portion of the connection plate 3 is spline-engaged with an exterior circumference of the input shaft IS. Therefore, when the engine clutch ECL is operated, the torque of the engine output shaft EOS is transmitted to the input shaft IS.

The connection plate 3 is rotatably supported in an axial direction by an extend end 4 extending rearward from the engine output shaft EOS through a bearing B.

The engine clutch ECL shares the shared clutch drum SCD, and is configured to selectively transmit a torque between an engine output shaft EOS and the input shaft IS.

In the engine clutch ECL, a plurality of engine clutch plates 11 and a reaction plate 11a are spline-engaged with the interior circumference of the shared clutch drum SCD.

An engine clutch hub 13 is fixed to an extended end 4 of the engine output shaft EOS by welding. A plurality of engine clutch disks 15 are alternatingly disposed between the plurality of engine clutch plates 11 and the reaction plate 11a, and are spline-engaged with an exterior circumference of the engine clutch hub 13.

An engine clutch piston 17 is disposed to frictionally operate the plurality of engine clutch plates 11 and the plurality of the engine clutch disks 15 along the axial direction by an engine slave cylinder ESC.

The engine slave cylinder ESC is formed at an interior of the supporting end 1 of the front cover FC, and the engine clutch piston 17 is disposed between the engine slave cylinder ESC and the engine clutch plates 11.

In the engine clutch ECL, a wave spring (not shown) may be installed between adjacent engine clutch plates 11 to provide a restoring force and to maintain a gap between clutch plates 11 and clutch disks 15 in a released state, thereby reducing or minimizing a drag loss of friction members.

The first and third clutches CL1 and CL3 are disposed in two rows in the radial direction, i.e., radially inward and outward, in a radially interior side of the shared clutch drum SCD. The first and third clutches CL1 and CL3 are configured to selectively transmit the torque of the input shaft IS to the first and third output shafts OS1 and OS3, respectively.

The first clutch CL1 shares the shared clutch drum SCD with the engine clutch ECL, and a plurality of first clutch plates 21 are spline-engaged with the interior circumference of the shared clutch drum SCD.

A first clutch hub 23 is fixed by welding to a first connecting member 5 spline-engaged with an exterior circumference of the first output shaft OS1. A plurality of first clutch disks 25 are alternatingly disposed between the first clutch plates 21 and spline-engaged with the exterior circumference of the first clutch hub 23.

In addition, a first clutch piston 27 to frictionally operate the first clutch plates 21 and the first clutch disks 25 is disposed movably in the axial direction by the first slave cylinder SC1.

The first connecting member 5 is rotatably supported in the axial direction by the connection plate 3 via a bearing B interposing between the first connecting member 5 and the connection plate 3.

The third clutch CL3 is disposed at a radially interior side to the first clutch CL1, and a radially outer portion of a third clutch drum 31 is connected to the interior circumference of the shared clutch drum SCD to be fixed in the axial direction.

The third clutch drum 31 includes a bent end 31a that is bent radially inward so as to act as a reaction plate of the third clutch 31.

A plurality of third clutch plates 33 are spline-engaged with an interior circumference of the third clutch drum 31 and are supported in the axial direction by the bent end 31a.

A third clutch hub 35 is fixed by welding to a third connecting member 7 spline-engaged with an exterior circumference of the third output shaft OS3. A plurality of third clutch disks 37 are alternatingly disposed between the third clutch plates 33 and spline-engaged with the exterior circumference of the third clutch hub 35.

In addition, a third clutch piston 39 to frictionally operate the third clutch plates 33 and the third clutch disks 37 is disposed movably in the axial direction by a third slave cylinder SC3.

The third connecting member 7 is rotatably supported in the axial direction by the first connecting member 5 via a bearing B interposing between the third connecting member 7 and the first connecting member 5.

The third clutch CL3 further includes a restoring unit 41 between the third clutch piston 39 and the third connecting member 7 connected to the third clutch hub 35.

The restoring unit 41 includes a supporting member 43 and a plurality of springs 45. A radially inner portion of the supporting member 43 is rotatably supported by an exterior circumference of the third connecting member 7 via a bearing B, and radially outer portion of the supporting member 43 is spline-engaged with the interior circumference of the third clutch drum 31.

The plurality of springs 45 are disposed along a circumferential direction between the supporting member 43 and the third clutch piston 39, thereby applying a restoring force to the third clutch piston 39.

In the first and third clutches CL1 and CL3, a wave spring (not shown) may be installed between adjacent first clutch plates 21 and adjacent third clutch plates 33 to provide a restoring force and to maintain a gap therebetween in a released state, thereby reducing or minimizing a drag loss of friction members The first and third slave cylinders SC1 and SC3 may be formed at the transmission case H, and include cylinder rods to operate the first and third clutch pistons 27 and 39 of the first and third clutches CL1 and CL3 in the axial direction.

The cylinder rods of the first and third slave cylinders SC1 and SC3 rotatably support the first and third clutch pistons 27 and 39 via interposing bearings B, respectively. The present form show a double concentric slave cylinder (double CSC) scheme, where the slave cylinders are arranged in two rows in the radial direction.

Referring to FIG. 3, the planetary gear set PG is disposed on the second output shaft OS2, and includes a ring gear R that is spline-engaged with an exterior circumference of the second output shaft OS2 through a connection ring 9.

In more detail, the planetary gear set PG is formed as a single pinion planetary gear set, and includes a sun gear S, a planet carrier PC rotatably supporting a plurality of pinion gears P externally gear-meshed with the sun gear S, and the ring gear internally gear-meshed with the plurality of pinion gears P.

The planet carrier PC is formed as a hollow shaft and coaxially disposed with the second output shaft OS2 without rotational interference. The planet carrier PC is spline-engaged with an exterior circumference of the fourth output shaft OS4 that transmits a torque to a shifting device (not shown).

The second clutch CL2 is disposed radially external to the planetary gear set PG, and selectively connects the input shaft IS and the sun gear S of the planetary gear set PG.

That is, the second clutch CL2 is disposed at a same axial location with but radially exterior to the planetary gear set PG, and a second clutch drum 51 is spline-engaged with an exterior circumference of the input shaft IS through a second connecting member 8.

The second connecting member 8 is rotatably supported in the axial direction by the connection ring 9 and the transmission case H via interposing bearings B.

A plurality of second clutch plates 53 are spline-engaged with an interior circumference of the second clutch drum 51.

The sun gear S of the planetary gear set PG is fixedly connected to a second clutch hub 55.

A plurality of second clutch disks 57 are alternatingly disposed between the second clutch plates 53 and spline-engaged with an exterior circumference of the second clutch hub 55.

A second slave cylinder SC2 is disposed in the transmission case H to frictionally operate the second clutch plates 53 and the second clutch disks 57.

The second slave cylinder SC2 includes a second clutch piston CP and a supporting bearing B2. The second clutch piston CP corresponds to the second clutch plates 53 in the axial direction and disposed in a hydraulic chamber Y formed in the transmission case H. The supporting bearing B2 is disposed between the second clutch plates 53 and the second clutch piston CP.

In addition, a return spring SP is disposed between a radially outer portion of the second clutch piston CP and a spring retainer RT fixed to the transmission case H through a snap ring 59, and applies a restoring force to the second clutch piston CP.

According to a power transmission apparatus according to an exemplary form, referring to FIG. 1, when the engine clutch ECL is operated by the engine slave cylinder ESC, the engine clutch disks 15 and the engine clutch plates 11 are frictionally engaged, and the torque of the engine output shaft EOS is transmitted to the shared clutch drum SCD through the engine clutch hub 13.

The torque transmitted to the shared clutch drum SCD is also transmitted to the input shaft IS through the connection plate 3.

When the first clutch CL1 is operated by the first slave cylinder SC1 while the engine clutch ECL is being operated, the first clutch disks 25 and the first clutch plates 21 are frictionally engaged, and the torque of the engine output shaft EOS is transmitted to the first output shaft OS1 through the first clutch hub 23 and the first connecting member 5.

When the third clutch CL3 is operated by the third slave cylinder SC3 while the engine clutch ECL is being operated, the third clutch disk 37 and the third clutch plate 33 are frictionally engaged, and the torque of the engine output shaft EOS is transmitted from the third clutch drum 31 spline-engaged with the shared clutch drum SCD to the third output shaft OS3 through the third clutch hub 35 and the third connecting member 7.

When the second clutch CL2 is operated by the second slave cylinder SC2 while the engine clutch ECL is being operated, the second clutch disks 57 and the second clutch plates 53 are frictionally engaged, and the torque of the engine output shaft EOS is transmitted to the sun gear S of the planetary gear set PG sequentially through the connection plate 3 spline-engaged with the shared clutch drum SCD, the input shaft IS, the second connecting member 8, the second clutch drum 51, and second clutch hub 55.

According to an exemplary form as described above, the first clutch CL1 sharing the shared clutch drum SCD with the engine clutch ECL is disposed adjacent to the engine clutch ECL at a forward portion of the input shaft IS, the third clutch CL3 is disposed in a radially interior side of the first clutch CL1 to form two rows in the radial direction, and the second clutch CL2 is separately arranged at a rearward portion of the input shaft IS, thereby reducing number of parts in the transmission and decreasing length and weight.

Since the torque of the motor M may be received by the motor gear MG externally gear-meshed with the motor M, the motor M may be employed in an off-axis scheme where the motor M is provided on an axis separate from the input shaft IS, and therefore, the length of a transmission including a torque delivery path of the motor M may be reduced.

In addition, the number of parts for receiving a torque of the motor M may be reduced since the first and third clutches CL1 and CL3 disposed in two rows in the radial direction share a shared clutch drum SCD with the engine clutch ECL, and the shared clutch drum SCD is formed with a motor gear MG externally gear-meshed with the motor M to receive a torque from the motor M.

In addition, since the second clutch CL2 is separated to the rearward portion of the input shaft IS, there may be provided a better space at a forward portion of the transmission for a differential gear (not shown), which provides an advantage in the layout of the transmission.

In addition, in the second clutch CL2, the second clutch piston CP to frictionally operate the second clutch plates 53 and the second clutch disks 57 is integrally formed with the second slave cylinder SC2 and installed in the hydraulic chamber Y formed in the transmission case H, thereby reducing a space for arranging the second clutch piston CP.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of Symbols>
FC: front cover
H: transmission case
1: supporting end
3: connection plate
5, 8, 7: first, second, third connecting members
9: connection ring
IS: input shaft
ECL: engine clutch
CL1, CL2, CL3: first, second, and third clutches
SC1, SC2, SC3: first, second, and third slave cylinders
EOS: engine output shaft
OS1, OS2, OS3, OS4: first, second, third, and fourth output shafts
SCD: shared clutch drum
B: bearing
B2: supporting bearing
PG: planetary gear set
11: engine clutch plate
13: engine clutch hub
15: engine clutch disk
17: engine clutch piston
21, 53, 33: first, second, and third clutch plates
25, 57, 37: first, second, and third clutch disks
23, 55, 35: first, second, and third clutch hubs
51, 31: second and third clutch drums
27, CP, 39: first, second, and third clutch pistons
41: restoring unit
43: supporting member
45: spring
Y: hydraulic chamber
RT: spring retainer
SP: return spring

What is claimed is:

1. A power transmission apparatus for a hybrid electric vehicle having an engine and a motor as power sources, the power transmission apparatus comprising:
    an engine output shaft receiving a torque of the engine;
    an input shaft coaxially disposed with the engine output shaft;
    first and second output shafts formed as hollow shafts coaxial with the input shaft, and respectively disposed at forward and rearward sides of the input shaft without rotational interference;
    a third output shaft formed as a hollow shaft and coaxially disposed with the first output shaft without rotational interference;
    a shared clutch drum disposed at the forward side of the input shaft, and having a motor gear formed on an exterior circumference of the shared clutch drum, wherein the motor gear is externally gear-meshed with the motor, and the shared clutch drum has an interior circumference rotatably supported by a supporting end formed at a radially interior side of a front cover, and is connected to the input shaft through a connection plate;
    an engine clutch arranged on the interior circumference of the shared clutch drum and configured to selectively transmit a torque between the engine output shaft and the input shaft;
    first and third clutches disposed in two rows in a radial direction within the interior circumference of the shared clutch drum and configured to selectively transmit the torque of the input shaft to the first and third output shafts, respectively;
    a planetary gear set disposed on the second output shaft and including a ring gear spline-engaged with the second output shaft through a connection ring; and
    a second clutch disposed radially external to the planetary gear set and selectively connecting the input shaft and a sun gear of the planetary gear set.

2. The power transmission apparatus of claim 1, wherein the connection plate is formed in a disk shape disposed between the engine clutch and the third clutch, and wherein the connection plate comprises: a radially outer portion spline-engaged with the interior circumference of the shared clutch drum, and a radially inner portion spline-engaged with an exterior circumference of the input shaft.

3. The power transmission apparatus of claim 1, wherein the engine clutch comprises:
    a plurality of engine clutch plates spline-engaged with the interior circumference of the shared clutch drum;
    an engine clutch hub fixed to an extended end of the engine output shaft;

a plurality of engine clutch disks alternatingly disposed between the plurality of engine clutch plates and spline-engaged with an exterior circumference of the engine clutch hub; and an engine clutch piston disposed between an engine slave cylinder and the plurality of engine clutch plates to frictionally operate the plurality of engine clutch plates and the plurality of engine clutch disks by the engine slave cylinder.

4. The power transmission apparatus of claim 3, wherein the engine slave cylinder is formed at an interior of the supporting end of the front cover.

5. The power transmission apparatus of claim 1, wherein the first clutch comprises:

a plurality of first clutch plates spline-engaged with the interior circumference of the shared clutch drum;

a first clutch hub spline-engaged with an exterior circumference of the first output shaft through a first connecting member;

a plurality of first clutch disks alternatingly disposed between the plurality of first clutch plates and spline-engaged with an exterior circumference of the first clutch hub; and a first clutch piston disposed between a first slave cylinder and the plurality of first clutch plates and configured to frictionally operate the plurality of first clutch plates and the plurality of first clutch disks by the first slave cylinder.

6. The power transmission apparatus of claim 5, wherein the first connecting member is supported in an axial direction by the connection plate via a bearing interposing between the first connecting member and the connection plate.

7. The power transmission apparatus of claim 5, wherein the third clutch comprises:

a third clutch drum disposed radially interior to the first clutch and connected to the interior circumference of the shared clutch drum to be fixed in an axial direction;

a plurality of third clutch plates spline-engaged with the interior circumference of the third clutch drum;

a third clutch hub spline-engaged with an exterior circumference of the third output shaft through a third connecting member;

a plurality of third clutch disks alternatingly disposed between the plurality of third clutch plates and spline-engaged with an exterior circumference of the third clutch hub; and a third clutch piston disposed between a third slave cylinder and the plurality of third clutch plates and configured to frictionally operate the plurality of third clutch plates and the plurality of third clutch disks by the third slave cylinder.

8. The power transmission apparatus of claim 7, wherein the third connecting member is supported in the axial direction by the first connecting member via a bearing interposing between the third connecting member and the first connecting member.

9. The power transmission apparatus of claim 7, wherein the third clutch further comprises a restoring unit disposed between the third clutch piston and the third connecting member connected to the third clutch hub.

10. The power transmission apparatus of claim 9, wherein the restoring unit comprises:

a supporting member having radially inner and outer portions, the radially inner portion being rotatably supported by an exterior circumference of the third connecting member via a bearing, the radially outer portion being spline-engaged with the interior circumference of the third clutch drum; and a plurality of springs disposed between the supporting member and the third clutch piston.

11. The power transmission apparatus of claim 7, wherein the first and third slave cylinders are installed in a transmission case in two rows in the radial direction.

12. The power transmission apparatus of claim 1, wherein the second clutch comprises:

a second clutch drum disposed radially external to the planetary gear set and spline-engaged with the input shaft through a second connecting member;

a plurality of second clutch plates spline-engaged with an interior circumference of the second clutch drum;

a second clutch hub fixedly connected to the sun gear of the planetary gear set;

a plurality of second clutch disks alternatingly disposed between the plurality of second clutch plates and spline-engaged with an exterior circumference of the second clutch hub; and a second slave cylinder disposed in a transmission case and configured to frictionally operate the plurality of second clutch plates and the plurality of second clutch disks.

13. The power transmission apparatus of claim 12, wherein the second connecting member is rotatably supported in an axial direction by the connection ring and the transmission case via bearings.

14. The power transmission apparatus of claim 12, wherein the second slave cylinder comprises:

a second clutch piston corresponding to the plurality of second clutch plates in an axial direction and disposed in a hydraulic chamber formed in the transmission case;

a supporting bearing disposed between the second clutch plates and the second clutch piston; and a return spring disposed between a radially outer portion of the second clutch piston and a spring retainer fixed to the transmission case.

* * * * *